US008028197B1

(12) United States Patent
Barua et al.

(10) Patent No.: US 8,028,197 B1
(45) Date of Patent: Sep. 27, 2011

(54) PROBLEM TICKET CAUSE ALLOCATION

(75) Inventors: Abhik Barua, Overland Park, KS (US); Deandra T. Cassone, Overland Park, KS (US); Richard Motilal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 174 days.

(21) Appl. No.: 12/567,293

(22) Filed: Sep. 25, 2009

(51) Int. Cl.
*G06F 11/00* (2006.01)

(52) U.S. Cl. .......................................... 714/26; 714/47.3

(58) Field of Classification Search ............... 714/26, 714/47.2, 47.3, 48, 57; 379/9.03, 9.04; 702/185
See application file for complete search history.

(56) References Cited

U.S. PATENT DOCUMENTS

| | | | | |
|---|---|---|---|---|
| 5,790,634 | A * | 8/1998 | Kinser et al. ............... | 379/29.01 |
| 6,006,016 | A * | 12/1999 | Faigon et al. .................... | 714/48 |
| 6,981,039 | B2 * | 12/2005 | Cerami et al. ................. | 709/223 |
| 7,266,734 | B2 * | 9/2007 | Chavez et al. .................. | 714/48 |
| 2005/0246590 | A1 * | 11/2005 | Lancaster ....................... | 714/47 |
| 2008/0126858 | A1 * | 5/2008 | Barras ............................ | 714/25 |
| 2009/0049338 | A1 * | 2/2009 | Unnikrishnan et al. ......... | 714/26 |
| 2009/0055684 | A1 * | 2/2009 | Jamjoom et al. ................ | 714/26 |
| 2009/0063902 | A1 * | 3/2009 | Cowart et al. .................. | 714/37 |
| 2010/0138694 | A1 * | 6/2010 | Harrison et al. ................. | 714/26 |
| 2010/0211817 | A1 * | 8/2010 | Yang et al. ....................... | 714/4 |
| 2010/0218031 | A1 * | 8/2010 | Agarwal et al. .................. | 714/2 |
| 2010/0275054 | A1 * | 10/2010 | Grace et al. ....................... | 714/2 |
| 2010/0318846 | A1 * | 12/2010 | Sailer et al. ...................... | 714/26 |
| 2011/0060946 | A1 * | 3/2011 | Gupta et al. ..................... | 714/26 |

* cited by examiner

*Primary Examiner* — Marc Duncan

(57) ABSTRACT

Systems and methods are provided for problem ticket resolution. A resolution component allocates a cause for each problem ticket, assigned by resolution teams to root cause clusters, to systems based on historical records that identify one of multiple historical systems as a cause for each historical problem ticket. If a corresponding number of causes allocated to a system is a predetermined amount greater than a corresponding historical number of causes allocated to the system, the resolution component may output a notification to a user interface to prompt a management action regarding the system, access a report associated with the system and output a notification to the user interface to prompt a management action regarding the system based on the report, or assign a set of problem tickets allocated to the system to a resolution team.

20 Claims, 3 Drawing Sheets

Fig. 3

PROBLEM TICKET CAUSE ALLOCATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the operation of computing software, computing hardware, or other complex systems, problems impacting a desired outcome can arise. An enterprise operating such a system may have a problem management system in place to assist in identifying and resolving problems. A problem may be defined as an occurrence that has a negative impact on a desired outcome. A cause of a problem may be defined as an underlying source of one or more problems. A problem may go unnoticed until an enterprise is swamped with a large number of problems created by the cause of the problem, which may create cascading failures in other systems due to overload situations or dependencies. A problem management system may not alert enterprise management of a developing problem until it is too late for the enterprise management to effectively prevent the escalation of the problem, which may reduce customer satisfaction and/or result in the loss of business.

SUMMARY

In some embodiments, a system is provided for problem ticket resolution. The system includes a processor, a memory, and a resolution component stored in the memory. When executed by the processor, the resolution component allocates a cause for each problem ticket, assigned by resolution teams to root cause clusters, to systems based on historical records that identify one of multiple historical systems as a cause for each historical problem ticket. The resolution component outputs a notification to a user interface to prompt a management action regarding a system if a corresponding number of causes allocated to the system is a predetermined amount greater than a corresponding historical number of causes allocated to the system.

In some embodiments, a computer implemented method is provided for problem ticket resolution. A resolution component, stored in a memory and executed by a processor, allocates a cause for each problem ticket, assigned by resolution teams to root cause clusters, to systems based on historical records that identify one of multiple historical systems as a cause for each historical problem ticket. The resolution component accesses a report associated with a system if a corresponding number of causes allocated to the system is a predetermined amount greater than a corresponding historical number of causes allocated to the systems. The resolution component outputs a notification to a user interface to prompt a management action regarding the system based on the report.

In some embodiments, a system is provided for problem ticket resolution. The system includes a processor, a memory, and a resolution component stored in the memory. When executed by the processor, the resolution component allocates a cause for each problem ticket, assigned by resolution teams to root cause clusters, to systems based on historical records that identify one of multiple historical systems as a cause for each historical problem ticket. The resolution component assigns a set of problem tickets allocated to a system to a resolution team if a corresponding number of causes allocated to the system is a predetermined amount greater than a corresponding historical number of causes allocated to the system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

An enterprise may operate a problem management system that assigns problem tickets to resolution teams to resolve problems without identifying the underlying causes of the problem tickets. For example, a resolution team may receive a problem ticket that indicates that an order processing system rejected an order placed by one of the enterprise's customers and take actions that result in the order processing system accepting the customer's order. However, the resolution team may not currently have the time or the resources to identify whether the order processing system rejected the customer's order because of an underlying problem with the order processing system, an order entry system, or an interface between the order entry system and the order processing system. A resolution team may assign a problem ticket to a root cause cluster for potential future investigation into the underlying cause of a problem ticket. For example, the resource team may assign the problem ticket to a root cause cluster for problem tickets associated with the order processing system rejecting customer orders, and the enterprise may subsequently identify which system was the underlying cause for the problem ticket. However, until the underlying cause for a problem ticket is corrected, the cause of a system problem may continue to create additional problems that result in additional problem tickets for the enterprise.

Embodiments of the present disclosure provide systems and methods for problem ticket cause allocation. In some contexts, problem ticket cause allocation may be referred to as problem ticket resolution. A resolution component allocates a cause for each problem ticket, assigned by resolution teams to root cause clusters, to systems based on historical records that identify one of multiple historical systems as a cause for each historical problem ticket. For example, the resolution component allocates 30 percent of a cause of a problem ticket for an order rejection to an order entry system, 50 percent of the cause to an order processing system, and 20 percent of the cause to an interface between the order entry system and the order processing system because 30 percent of previous order rejections were caused by the order entry system, 50 percent of previous order rejections were caused by the order processing system, and 20 percent of previous order rejections were caused by the interface. The resolution component determines whether the number of causes of problem tickets allocated to a system is a predetermined amount greater than the historical number of causes of problem tickets allocated to the system. For example, the resolution component determines that an aggregation of 39.4 causes of problem tickets allocated on Tuesday at noon to the order processing system is more than 25 percent greater than the historical average of an aggregated 25.2 causes of problem tickets allocated to the order processing system on Tuesday at noon. If the number of causes of problem tickets allocated to a system is a predetermined amount greater than the historical number of causes of problem tickets allocated to the system, the resolution component may output a notification to a user interface to prompt a management action regarding the system. For example, the resolution component outputs a proposed solution to a technician based on an order processing system component that previously caused problems. By proportionally aggregating the potential causes for the current problem tickets, the resolution component may enable an enterprise to identify and correct the causes of system problems much earlier in the problem management process, such that causes of system problems may be corrected before creating an avoidable amount of additional problems.

The resolution component may also access a report associated with the system and output a notification to the user interface to prompt a management action regarding the system based on the report. For example, the resolution component outputs a report from the order processing system which indicates that the 56 percent increase in causes of problem tickets allocated to the order processing system may be due to a 52 percent increase in orders processed by the order processing system. The resolution component may combine proportional allocations of causes with system reports to improve the process of identifying causes of system problems earlier.

The resolution component may also assign a set of problem tickets allocated to a system to a resolution team. For example, in an embodiment, the resolution component may assign a group of problem tickets, each of which have their cause allocated at least 50% to the order processing system, to a resolution team to address the underlying cause for the group of problem tickets, for example to fix a bug in the order processing system interface. In another embodiment, the resolution component may assign a problem ticket to a group which has the highest cause allocation percentage associated with the problem ticket, even if this percentage is less than 50%.

In another embodiment, the resolution component may associate a plurality of trouble tickets, each ticket having its own cause allocation, sum the cause allocation for each cause across each of the associated tickets, and assign the plurality of associated trouble tickets to a group which has the highest cause allocation percentage, collectively. The plurality of trouble tickets may be associated by one or more of a time of creation, a severity level, or other principle of association. For example, three trouble tickets created within the same three minute time interval may be associated. A first trouble ticket may have its cause allocated 20% to cause A, 40% to cause B, and 40% to cause C. A second trouble ticket may have its cause allocated 30% to cause A, 35% to cause D, and 35% to cause E. A third trouble ticket may have its cause allocated 10% to cause A, 45% to cause F, and 45% to cause G. Summing the cause allocations, cause A is associated with 60% of the causes of the associated trouble tickets, cause B is associated with 40% of the causes of the associated trouble tickets, cause C is associated with 40% of the causes of the associated trouble tickets, cause D is associated with 35% of the causes of the associated trouble tickets, cause E is associated with 35% of the associated trouble tickets, cause F is associated with 45% of the causes of the associated trouble tickets, and cause G is associated with 45% of the causes of the associated trouble tickets. In this example, the group of associated three trouble tickets would all be assigned to the problem resolution team assigned to resolve the underlying cause A. Note that there is no requirement that the sum of aggregated percentages sum to 100%. Alternatively, aggregated percentages could be normalized to sum to 100% by dividing through each raw aggregated percentage by the sum of the raw aggregated percentages. This alternative method of allocating trouble tickets based on aggregating cause percentages across an associated plurality of trouble tickets may address the circumstances that often trouble tickets may be created that are seemingly unrelated but are caused by the same underlying causes.

Figure 1:
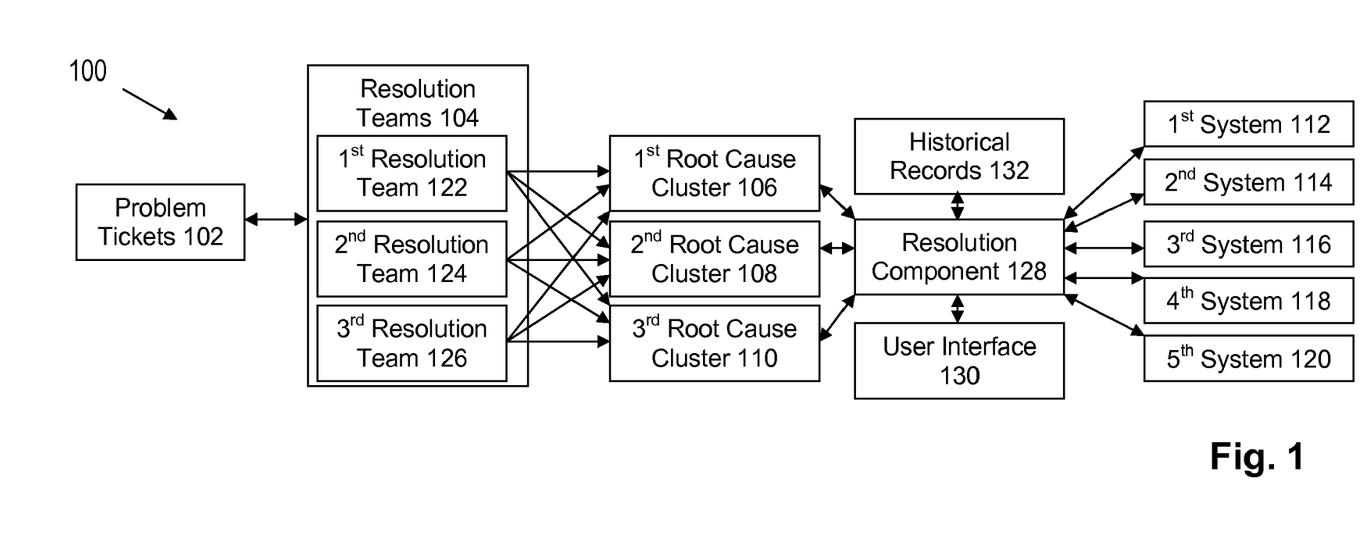
FIG. 1 is a block diagram of a system for problem ticket resolution according to some embodiments of the present disclosure.

FIG. 1 is a block diagram of a system 100 for problem ticket resolution according to some embodiments of the present disclosure. The system 100 includes problem tickets 102, resolution teams 104, a first root cause cluster 106, a second root cause cluster 108, a third root cause cluster 110, a first system 112, a second system 114, a third system 116, a fourth system 118, and a fifth system 120. The resolution teams 104 may include a first resolution team 122, a second resolution team 124, and a third resolution team 126. The resolution teams 104 may resolve the problem tickets 102 by correcting the symptoms associated with the problem tickets 102 and assign the problem tickets 102 to the root cause clusters 106-110 to assist in identifying the cause of the problem tickets 102 in the systems 112-120. For example, the first resolution team 122 may receive one of the problem tickets 102 that indicates that the third system 116 rejected an order placed by one of the enterprise's customers, take actions that result in the third system 116 accepting the customer's order, and assign the problem ticket to the first root cause cluster 106 for problem tickets associated with the third system 116 rejecting customer orders.

Each of the resolution teams 104 may assign problems tickets associated with a predetermined level of complexity and/or a predetermined level of severity to the root cause clusters 106-110. For example, the first resolution team 122 may resolve and assign the problem tickets 102 with high complexity and/or high severity, the third resolution team 126 may resolve and assign the problem tickets 102 with low complexity and/or low severity, and the second resolution team 124 may resolve and assign the remaining problem tickets 102. The systems 112-120 may be an order entry system 112, an order processing system 116, an order delivery system 120, an interface 114 between the order entry system 112 and the order processing system 116, and an interface 118 between the order processing system 116 and the order delivery system 120, and may be referred to as such.

The system 100 may also include a resolution component 128, a user interface 130, and historical records 132. The resolution component 128 may be implemented by a computer system, such as the computer system discussed below in reference to FIG. 3. The resolution component 128 may output notifications to the user interface 130 based on data accessed from the historical records 132. Each of the system elements 102-132 may be executed and/or stored on one or more computer systems. FIG. 1 depicts the system elements 102-132 for the purpose of an example, as the system 100 may include any number and type of the system elements 102-132. Some details and/or elements of the system 100 are not shown or described so as to not crowd FIG. 1 with details.

The resolution component 128 allocates the causes of the problem tickets 102, assigned by the resolution teams 104 to the root cause clusters 106-110, to the systems 112-120 based on the historical records 132 that identify one of the systems 112-120 as a cause for each historical problem ticket. For example, the resolution teams 104 resolved 19 of the problem tickets 102 for order rejections, resolved 41 of the problem tickets 102 for wrong order deliveries, and resolved 30 of the problem tickets 102 for orders not delivered within ten business days. The resolution teams 104 also assigned the 19 of the problem tickets 102 to the first root cause cluster 106 for order rejections, the 41 of the problem tickets to the second root cause cluster 108 for wrong order deliveries, and the 30 of the problem tickets 102 to the third root cause cluster 110 for orders not delivered within ten business days.

Continuing this example, the resolution component 128 allocates 30 percent of the cause of each problem ticket for an order rejection to the order entry system 112, 50 percent of the cause to the order processing system 116, and 20 percent of the cause to the interface 114 between the order entry system 112 and the order processing system 116 because 30 percent of previous order rejections were historically caused by the order entry system 112, 50 percent of previous order rejections were historically caused by the order processing system 116, and 20 percent of previous order rejections were historically caused by the interface 114. In another example, the resolution component 128 allocates 45 percent of the cause of each problem ticket for a wrong order delivery to the order processing system 116, 30 percent of the cause to the interface 114 between the order entry system 112 and the order processing system 116, and 25 percent of the cause to the interface 118 between the order processing system 116 and the order delivery system 120. In yet another example, the resolution component 128 allocates 40 percent of the cause of each problem ticket for an order not delivered within ten business days to the order processing system 116, 45 percent of the cause to the order delivery system 120, and 15 percent of the cause to the interface 118 between the order processing system 116 and the order delivery system 120.

The resolution component 128 determines whether the aggregated number of the causes allocated to a system is a predetermined amount greater than the historical aggregated number of the causes allocated to the system. For example, the resolution component 128 multiplies the causes of 19 problem tickets for an order rejection by the 50 percent allocated to the order processing system 116 for an order rejection to produce 9.5 causes allocated to the order processing system 116 due to order rejections. In another example, the resolution component 128 multiplies the causes of 41 problem tickets for a wrong order delivery by the 40 percent allocated to the order processing system 116 for a wrong order delivery to produce 16.4 causes allocated to the order processing system 116 due to wrong order deliveries. In yet another example, the resolution component 128 multiplies the causes of 30 problem tickets for orders not delivered by the 45 percent allocated to the order processing system 116 for orders not delivered to produce 13.5 causes allocated to the order processing system 116 due to orders not delivered. Further to this example, resolution component 128 combines the allocations of 9.5 causes allocated to the order processing system 116 due to order rejections, 16.4 causes allocated to the order processing system 116 due to wrong order deliveries, and 13.5 causes allocated to the order processing system 116 due to orders not delivered to produce an aggregation of 39.4 causes allocated to problems with the order processing system 116. Continuing this example, the resolution component 128 determines whether the aggregated 39.4 causes allocated on Tuesday at noon to the order processing system 116 is more than 25 percent greater than the historical average of an aggregated 25.2 causes allocated to the order processing system 116 on Tuesday at noon. Furthermore, the resolution component 128 determines whether the aggregated number of causes allocated to each of the systems 112-120 is more than the historical aggregated average of the causes allocated to each of the systems 112-120 based on the same date and time. In some embodiments, the historical aggregated number of causes allocated to a system may not be based on date and time.

The aggregated causes allocated to the systems 112-120 may be adjusted for an amount of time spent on resolving each of the associated problem tickets 102 relative to an expected amount of time to resolve the associated problem tickets 102. Instead of allocating one cause of a problem ticket to the systems 112-120 for each of the problem tickets 102, the resolution component 128 may allocate a weighted cause value or relative cause value to the systems 112-120 for each cause of the problem tickets 102. For example, if 45% of a cause of a first problem ticket would otherwise be allocated to the order processing system 116, if it took 3.6 hours for the first resolution team 122 to resolve the first problem, and the historical average for the first resolution team 122 to resolve similar problem tickets is 3.0 hours, the resolution component 128 multiplies the 45% cause by a weighting coefficient of 1.2 (3.6/3.0=1.2) and allocates a cause of 0.54 to the order processing system 116 instead of the unweighted value of 0.45. In another example, if 40% of a cause of a second problem ticket would otherwise be allocated to the order processing system 116, if it took 1.2 hours for the third resolution team 126 to resolve the second problem ticket, and the historical average for the third resolution team 126 to resolve similar problem tickets is 1.5 hours, the resolution component 128 multiplies the 40% cause by a weighting coefficient of 0.8 (1.2/1.5=0.8) and allocates the cause of 0.32 to the order processing system 116 instead of the unweighted value of 0.4. It is understood that the same weighting factor may be used to determine the weighted cause value of other systems deemed to have a share in the root cause.

If the current aggregated causes of the problem tickets 102 allocated to a system exceeds the historical average aggregated causes allocated to the system by a threshold amount and/or a predetermined amount, the resolution component 128 may output a notification to the user interface 130 to prompt a management action regarding the system. For example, in an embodiment, the management action may comprise the resolution component 128 outputting a proposed solution to a technician based on an order processing system component identified as previously causing problems. After a problem ticket resolution action has been taken, the resolution component 128 may evaluate the resolution action and/or problem solution by analyzing whether the aggregated causes of problem tickets allocated to the system are reduced after the resolution action, for example if the current number of aggregated causes allocated to the system are less than the historical average of aggregated causes allocated to the system. For example, two hours after the technician implements the proposed solution for the order processing system component, the resolution component 128 recalculates the aggregated number of causes of the problem tickets 102 allocated to the order processing system 116. If the current aggregated causes allocated to the order processing system 116 are substantially less than the historical average of causes allocated to the order processing system 116, the proposed solution may be inferred to have been successful.

The management action may include justifying an allocation of resources to solve a root cause of trouble tickets. For example, a problem with the interface 114 truncating inputs having more than 35 characters in the address field may be perceived as relatively insignificant until the resolution component 128 identifies the aggregated number of the causes of the trouble tickets 102 attributed to this problem. A management team may use the analysis of aggregated causes to justify an investment of resources needed for correcting the truncation problem. The management action may also include implementing training for users of a system. For example, if 30 percent of the causes of the problem tickets allocated to the order entry system 112 are ultimately determined to be caused by customer service representatives entering customer information incorrectly, the management action may be to budget for customer service representatives to be trained to correctly use the order entry system 112.

The management action may include temporarily halting a system. For example, if the order entry system 112 is currently generating a problem ticket for 40 percent of the orders entered, the order entry system 112 may be temporarily shut down until the root cause of such a significant problem is corrected. By proportionally aggregating the potential causes for the current problem tickets 102, the resolution component 128 may enable an enterprise to identify and correct the causes of system problems much earlier in the problem management process, such that the causes of system problems may be corrected before creating an avoidable amount of additional problem tickets 102. In contrast to the resolution teams 104 addressing each of the problem tickets 102 only on an individual basis, the resolution component 128 aggregates information about the causes of the problem tickets 102 assigned to the root cause clusters 106-110 to collectively identify causes of problems in the systems 112-120 and alert management of system problems before the system problems escalate into more serious problems that lead to cascading failures of other systems.

The resolution component 128 may also access a report associated with a system and output a notification to the user interface 130 to help understand the status of problem tickets 102. For example, the resolution component 128 may output a report from the order processing system 116 indicating that a 52 percent increase in order volume is currently taking place which promotes the inference that the 56 percent increase in the causes of problem tickets 102 allocated to the order processing system 116 is due to this transient order increase and not to a new failure of the order processing system 116.

Accessing the report may include requesting the report and/or receiving the report on an occasional basis. For example, the resolution component 128 may request a report from the order processing system 116 if the aggregated number of the causes of the problem tickets 102 allocated to the order processing system 116 is substantially higher than normal for the time of day and the day of the week. Additionally, each of the systems 112-120 may send periodic system reports to the resolution component 128. The management action may include investigating other systems 112-120 based on the report. For example, if the report indicates that the central processing unit capacity for executing the order processing system 116 is within normal operating parameters, the resolution component 128 may suggest a proposed solution for the interface 114 as an alternative solution. The report may specify a number of orders in process by a system. For example, the report may indicate that the number of orders currently being processed by the order processing system 116 is very low, which may indicate that a problem exists with the interface 114 conveying orders from the order entry system 112 to the order processing system 116.

The report may specify a number of problem tickets resolved by the resolution teams 104 per unit of time relative to a historical average number of tickets resolved by the resolution teams 104 per unit of time. For example, if the third resolution team 126 averaged 1.2 hours to resolve the problem tickets 102 instead of the historical average of 1.5 hours for the third resolution team 126 to resolve problem tickets, the report may indicate that the problem tickets 102 recently resolved by the third resolution team 126 are less difficult to resolve, such that the resolution component 128 may take this reduced difficulty into account when selecting from candidate solutions. The report may adjust the number of the problem tickets 102 per unit of time for a number of resources available to the resolution teams 104. For example, if the first resolution team 122 averaged 3.6 hours to resolve the problem tickets 102 instead of the historical average of 3.0 hours for the third resolution team 126 to resolve problem tickets, the report may indicate that 20 percent of the first resolution team 122 is currently absent from work. In this situation, the problem tickets 102 recently resolved by the first resolution team 122 may be no more or no less difficult to resolve than normal, such that the resolution component 128 may take this normal level of difficulty into account when selecting from candidate solutions.

The management action may include reassigning a resource from one of the resolution teams 104 to another of the resolution teams 104 based on the report. For example, the resolution component 128 may suggest reassigning a member of the second resolution team 124 to assist the first resolution team 122 with resolving the problem tickets 102 because the second resolution team 124 is currently resolving tickets in significantly less time than normal and 20 percent of the first resolution team 122 is currently absent from work. The resolution component 128 may combine such allocations with system reports to improve the process of identifying causes of system problems earlier. Reports may enable management to take the cycle time for resolving the problem tickets 102 into account when evaluating proposed solutions offered by the resolution component 128.

The resolution component 128 may assign a set of the problem tickets 102 with causes allocated to a system to one of the resolution teams 104 based on a report associated with the system. For example, if the report from the order processing system 116 indicates that the central processing units executing the order processing system 116 are executing at a capacity that is double the normal capacity, this report may indicate the need for one of the resolution teams 104 to address the cause of the identified problem tickets 102 rather than the symptoms of the identified problem tickets 102. The resolution component 128 may assign a set of the problem tickets 102 with causes allocated to a system to a resolution team. For example, the resolution component 128 assigns a group of the problem tickets 102 each of which have a cause that is allocated at least 50 percent to the order processing system 116 to the first resolution team 122 to address the underlying cause for the group of the problem tickets 102. Therefore, in contrast to the system 100 assigning all problem tickets 102 to the resolution teams 104 based only on the symptoms of each of the problem tickets 102, the resolution component 128 may assign identified problem tickets to the resolution teams 104 after the root cause clusters have been identified for the problem tickets rather than before the identified problem tickets are resolved. Assigning identified problem tickets to the resolution teams 104 may more efficiently address the causes rather than the symptoms of the identified problem tickets.

Figure 2:
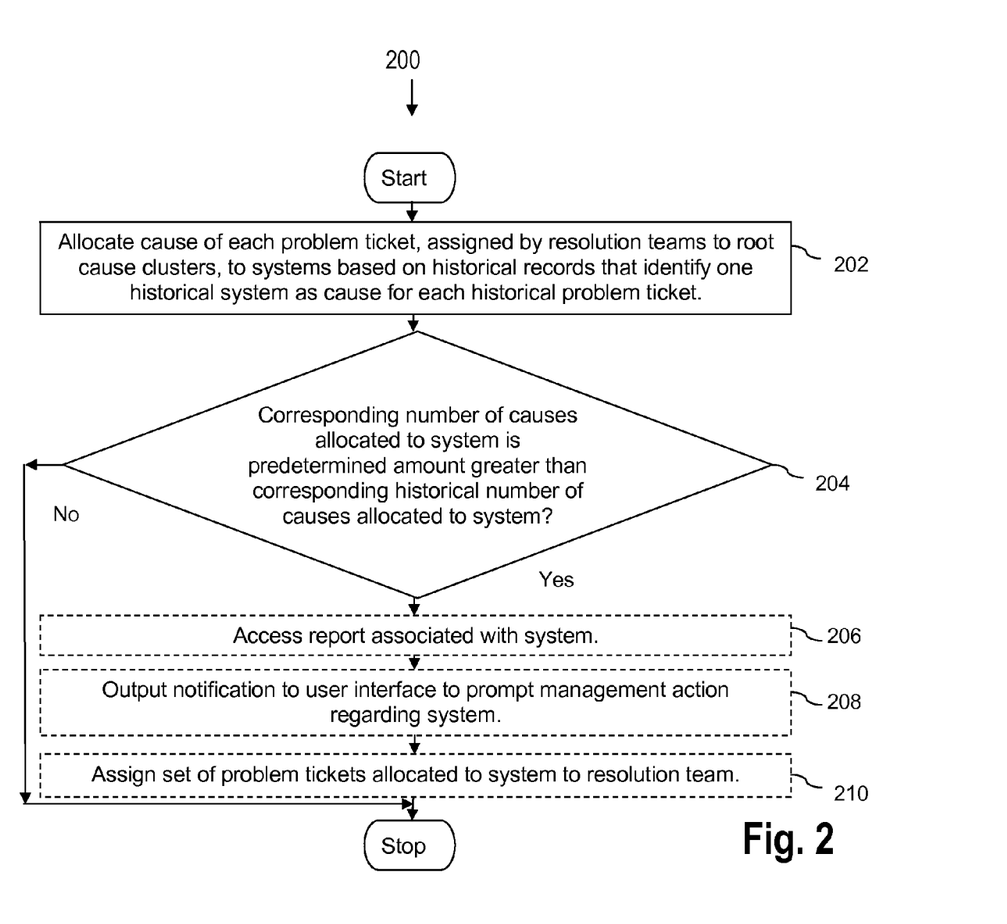
FIG. 2 is a flowchart of a method for problem ticket resolution according to some embodiments of the present disclosure.

FIG. 2 is a flowchart of a method 200 for problem ticket resolution according to some embodiments of the present disclosure. The system 100 may execute the method 200 to prompt management actions to correct causes of system problems based on the number of causes of problem tickets allocated to each system.

In box 202, causes of each problem ticket, which are assigned by resolution teams to root cause clusters, are allocated to systems based on historical records that identify one historical system as a cause for each historical problem ticket. For example, the resolution component 128 allocates the cause of 39.4 problem tickets 102 to the order processing system 116.

In box 204, a determination is made whether a corresponding number of causes allocated to a system is a predetermined amount greater than a corresponding historical number of causes allocated to the system. For example, the resolution component 128 determines whether the cause of 39.4 problem tickets allocated to the order processing system 116 is more than 25 percent greater than the cause of 25.2 problem tickets allocated to the order processing system 116 on Tuesdays at noon. If the corresponding number of causes allocated to a system is at least the predetermined amount greater than the corresponding historical number of causes allocated to the system, the method 200 continues to box 208. If the corresponding number of causes allocated to the system is not at least the predetermined amount greater than the corresponding historical number of causes allocated to the system, the method 200 terminates.

In box 206, a report associated with a system is accessed. For example, the resolution component 128 accesses a report that indicates an unusually large backlog of orders for the order processing system 116.

In box 208, a notification is output to a user interface to prompt a management action regarding a system. For example, the resolution component 128 outputs a proposed solution for the order processing system 116 based on the unusually large number of causes of problem tickets allocated to the order processing system 116 and the unusually large number of orders backlogged for the order processing system 116.

In box 210, a set of problem tickets allocated to a system is assigned to a resolution team. For example, the resolution component 128 assigns a set of the problem tickets 102 with causes allocated at least 50 percent to the order processing system 116 to the first resolution team 122 because the first resolution team 122 may correct the cause of the problem for the order processing system 116 rather than only the symptoms of the set of problem tickets 102.

Figure 3:
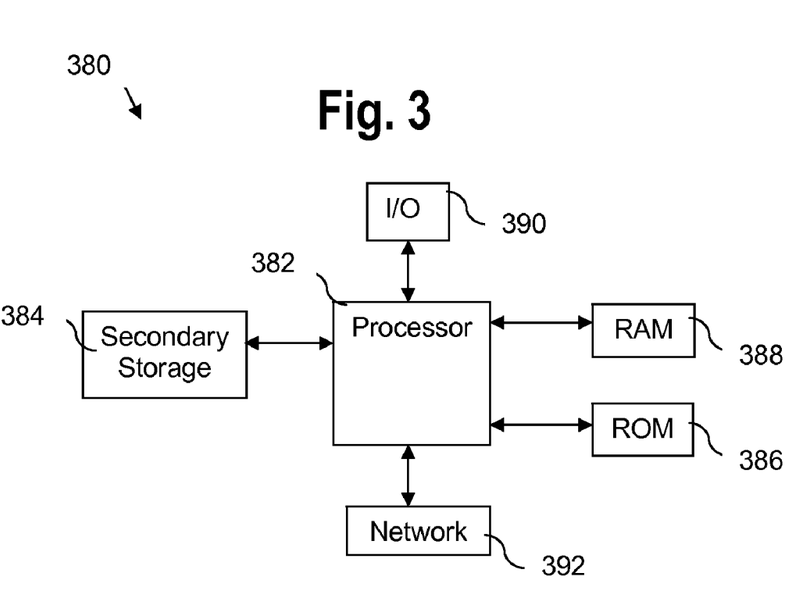
FIG. 3 shows an illustrative computer system suitable for implementing portions of the several embodiments of the present disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for problem ticket resolution, comprising:
   a processor;
   a memory; and
   a resolution component, stored in the memory, that when executed by the processor,
      allocates a cause for each of a plurality of problem tickets, assigned by a plurality of resolution teams to a plurality of root cause clusters, to a plurality of systems based on historical records that identify one of a plurality of historical systems as a cause for each of a plurality of historical problem tickets,
      determines whether a corresponding number of causes allocated to one of the plurality of systems is a predetermined amount greater than a corresponding historical number of causes allocated to the one of the plurality of systems,
      outputs a notification to a user interface to prompt a management action regarding the one of the plurality of systems in response to a determination that the corresponding number of causes allocated to the one of the plurality of systems is the predetermined amount greater than the corresponding historical number of causes allocated to the one of the plurality of systems.

2. The system of claim 1, wherein each of the plurality of resolution teams assigns problem tickets associated with at least one of a predetermined level of complexity and a predetermined level of severity.

3. The system of claim 1, wherein the plurality of systems comprise at least one of an order entry system, an order processing system, an order delivery system, an interface between the order entry system and the order processing system and an interface between the order processing system and the order delivery system.

4. The system of claim 1, wherein the corresponding number of causes is adjusted for a number of orders relative to a historical number of orders.

5. The system of claim 1, wherein the corresponding historical number of causes allocated to the one of the plurality of systems is based on at least one of a corresponding time of day and a corresponding day of week.

6. The system of claim 1, wherein the management action comprises justifying an allocation of resources to implement a solution based on the one of the plurality of systems.

7. The system of claim 1, wherein the management action comprises implementing training for users of the one of the plurality of systems.

8. The system of claim 1, wherein the management action comprises temporarily halting the one of the plurality of systems.

9. The system of claim 1, wherein the management action comprises implementing a solution based on the one of the plurality of systems.

10. The system of claim 9, wherein the resolution component further evaluates the solution based on a determination whether a corresponding number of causes allocated to the one of the plurality of systems after the solution is implemented is the predetermined amount greater than the corresponding historical number of causes allocated to the one of the plurality of systems.

11. A computer implemented method for problem ticket resolution, comprising:
allocating, by a resolution component stored in a memory and executed by a processor, a cause for each of a plurality of problem tickets, assigned by a plurality of resolution teams to a plurality of root cause clusters, to a plurality of systems based on historical records that identify one of a plurality of historical systems as a cause for each of a plurality of historical problem tickets;
determining, by the resolution component, whether a corresponding number of causes allocated to one of the plurality of systems is a predetermined amount greater than a corresponding historical number of causes allocated to the one of the plurality of systems;
accessing a report associated with the one of the plurality of systems in response to a determination that the corresponding number of causes allocated to the one of the plurality of systems is the predetermined amount greater than the corresponding historical number of causes allocated to the one of the plurality of systems; and
outputting, by the resolution component, a notification to a user interface to prompt a management action regarding the one of the plurality of systems based on the report.

12. The computer implemented method of claim 11, wherein accessing the report comprises at least one of requesting the report and receiving the report on an occasional basis.

13. The computer implemented method of claim 11, wherein the corresponding number of causes allocated to one of the plurality of systems is adjusted for an amount of time spent on each of the corresponding number of problem tickets relative to an expected amount of time spent on each of the corresponding number of problem tickets.

14. The computer implemented method of claim 11, wherein the report specifies a number of orders in process by the one of the plurality of systems.

15. The computer implemented method of claim 11, wherein the report specifies a number of problem tickets resolved by the plurality of resolution teams per unit of time relative to a historical number of tickets resolved by the plurality of resolution teams per unit of time.

16. The computer implemented method of claim 15, wherein the report adjusts the number of problem tickets resolved per unit of time for a number of resources available to the plurality of resolution teams.

17. The computer implemented method of claim 11, wherein the management action comprises investigating another one of the plurality of systems based on the report.

18. The computer implemented method of claim 11, wherein the management action comprises reassigning a resource from one of the plurality of resolution teams to another of the plurality of resolution teams based on the report.

19. A system for problem ticket resolution, comprising:
a processor;
a memory; and
a resolution component, stored in the memory, that when executed by the processor,
allocates a cause for each of a plurality of problem tickets, assigned by a plurality of resolution teams to a plurality of root cause clusters, to a plurality of systems based on historical records that identify one of a plurality of historical systems as a cause for each of a plurality of historical problem tickets,
determines whether a corresponding number of causes allocated to one of the plurality of systems is a predetermined amount greater than a corresponding historical number of causes allocated to the one of the plurality of systems,
assigns a set of problem tickets allocated to the one of the plurality of systems to one of the plurality of resolution teams in response to a determination that the corresponding number of causes allocated to the one of the plurality of systems is the predetermined amount greater than the corresponding historical number of causes allocated to the one of the plurality of systems.

20. The system of claim 19, wherein the resolution component assigns the set of problem tickets allocated to the one of the plurality of systems to one of the plurality of resolution teams based on a report associated with the one of the plurality of systems.

* * * * *